US010485172B2

(12) United States Patent
Cooper

(10) Patent No.: US 10,485,172 B2
(45) Date of Patent: Nov. 26, 2019

(54) DEVICE AND METHOD OF USE FOR PECAN PICKING

(71) Applicant: Terry Todd Cooper, Midland, TX (US)

(72) Inventor: Terry Todd Cooper, Midland, TX (US)

(*) Notice: Subject to any disclaimer, the term of this patent is extended or adjusted under 35 U.S.C. 154(b) by 0 days.

(21) Appl. No.: 15/784,016

(22) Filed: Oct. 13, 2017

(65) Prior Publication Data

US 2018/0103585 A1 Apr. 19, 2018

Related U.S. Application Data

(60) Provisional application No. 62/407,705, filed on Oct. 13, 2016.

(51) Int. Cl.
*A01D 51/00* (2006.01)
*A47L 5/36* (2006.01)

(52) U.S. Cl.
CPC ........... *A01D 51/002* (2013.01); *A01D 51/00* (2013.01); *A47L 5/365* (2013.01)

(58) Field of Classification Search
CPC ........ A01D 51/00; A01D 51/002; A47L 5/365
USPC .................................. 209/233, 397, 305, 359
See application file for complete search history.

(56) References Cited

U.S. PATENT DOCUMENTS

| 2,978,859 | A | * | 4/1961 | Tubbs | A01D 51/002 209/34 |
| 3,733,797 | A | * | 5/1973 | Kelley | A01D 51/00 56/16.5 |
| 3,808,785 | A | * | 5/1974 | Petcher | A01D 51/002 209/134 |
| 6,170,118 | B1 | * | 1/2001 | McIntyre | A47L 5/365 15/323 |
| 6,216,876 | B1 | * | 4/2001 | Quillian, III | A01D 46/005 15/300.1 |
| 2007/0226945 | A1 | * | 10/2007 | McIntyre | A47L 5/365 15/327.6 |

* cited by examiner

Primary Examiner — Alicia Torres
(74) Attorney, Agent, or Firm — Furr Law Firm; Jeffrey Furr, Esq.

(57) ABSTRACT

A device and method of use for a pecan picker which utilizes suction to pick up the pecans as well as a container body for storing the picked up pecans with at least one partition for separating the picked up pecans from extra extracted material obtained through the suction process. In one embodiment the device has a hose portion and a container body portion. The container body portion has a motor portion for providing suction for the device. In other embodiments the device also has a partition portion for separating the picked up pecans from extra extracted material obtained through the extraction or suction process. In another embodiment, the device also has a frame portion for moving the device.

12 Claims, 6 Drawing Sheets

DEVICE AND METHOD OF USE FOR PECAN PICKING

CROSS-REFERENCE TO RELATED APPLICATIONS

This application claims the priority date of Provisional Application No. 62/407,705 filed on Oct. 13, 2016.

FIELD OF THE INVENTION

The present invention generally relates to a device and method of use for picking up pecans. More specifically, the present invention generally relates to a device and method of use for pecan picking, which utilizes suction to pick up the pecans as well as a container body for storing the picked up pecans.

BACKGROUND OF THE INVENTION

Without limiting the scope of the disclosed device, the background is described in connection with a novel device and method of use for a pecan picker, which utilizes suction to pick up the pecans as well as a container body for storing the picked up pecans.

The process of picking up pecans can be a very manual process, with an individual combing through an area and picking up one pecan at a time with their hands. This is very tedious and time-consuming process. The individual has to lean down or get on their knees to pick up the pecans off of the ground.

To help alleviate these issues, several approaches in the prior art have been taken to make pecan picking more effective and efficient. These approaches involve various devices, which assist in various manners. The following examples are some of the common ones utilized today.

As a first example, U.S. Pat. No. 7,441,304 issued to Georg Maier et al. on Oct. 28, 2008 is for a vacuum arrangement for a ground area. The drawbacks to the device is how complicated it is. The device uses a combination of blower air flow and vacuum air flow. The blower air flow is directed to towards the area of the vacuum air flow. This approach is utilized to lift the material to be extracted from other environmental material. The other drawback is that there is no separation of the target material being extracted from the extra material extracted once within the device.

As a second example, U.S. Pat. No. 4,499,713 issued to Emory B. Stone Feb. 19, 1985 is for a nut harvester. A drawback to the device is that it is carried or strapped to the individual using the device. This adds a weight limitation to the amount of extracted material that can be carried before stopping to empty. In addition, carrying this weight greatly increases the fatigue on the individual using the device. In addition, another drawback is the dual use of blower air flow and vacuum air flow. The device also uses a separation mechanism within the collection tube blowing the extra extracted material out the back of the collection tube. There is no separation of the collected materials within the holding container.

While all of the aforementioned devices may fulfill their unique purposes, none of them fulfill the need for a practical, effective, and efficient means for picking up pecans off of the ground. It is an object of the present invention to overcome these shortcomings in the prior art.

Therefore, the present invention proposes a novel device and method of use for a pecan picker, which utilizes suction to pick up the pecans as well as a container body for storing the picked up pecans with at least one partition for separating the picked up pecans from extra extracted material obtained through the suction process.

BRIEF SUMMARY OF THE INVENTION

The present invention, therefore, provides for a device and method of use for picking up pecans. More specifically, the present invention generally relates to a device and method of use for pecan picking, which utilizes suction to pick up the pecans as well as a container body for storing the picked up pecans.

In one embodiment the device has a hose portion and a container body portion. The container body portion has a motor portion for providing suction for the device. In other embodiments the device also has a partition portion for separating the picked up pecans from extra extracted material obtained through the extraction or suction process. In another embodiment, the device also has a frame portion for moving the device.

In summary, the present invention discloses a novel device and method of use for a pecan picker, which utilizes suction to pick up the pecans as well as a container body for storing the picked up pecans with at least one partition for separating the picked pecans from extra extracted material obtained through the suction process.

BRIEF DESCRIPTION OF THE SEVERAL VIEWS OF THE DRAWINGS

For a more complete understanding of the features and advantages of the present invention, reference is now made to the detailed description of the invention along with the accompanying figures in which.

DETAILED DESCRIPTION OF THE INVENTION

Disclosed herein is an improved device and method of use directed to a pecan picking device. The numerous innovative teachings of the present invention will be described with particular reference to several embodiments (by way of example, and not of limitation).

Figure 1:
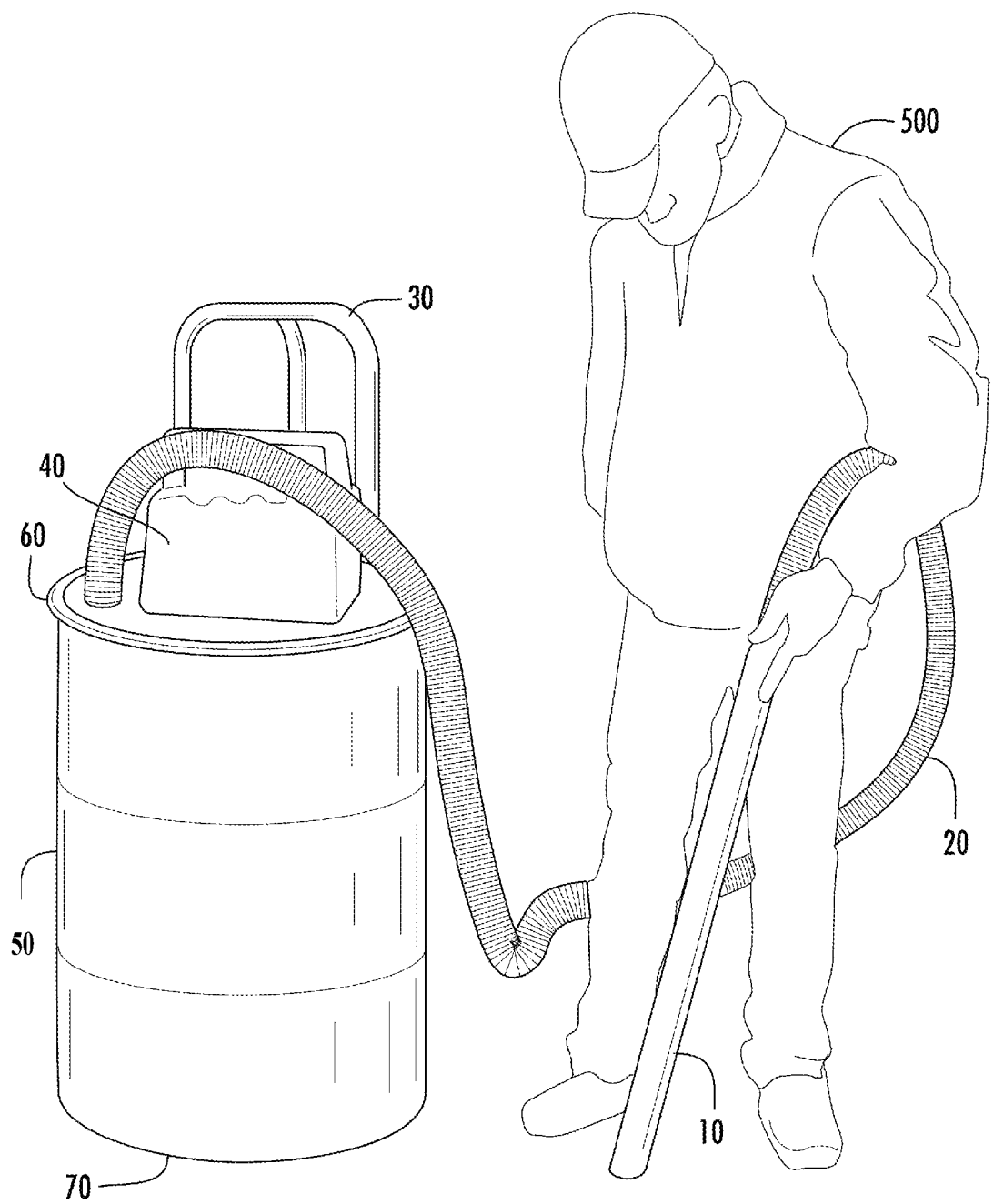
FIG. 1 is an environmental view of the pecan picking device in accordance with embodiments of the disclosure.

Reference is first made to FIG. 1, an environmental view of the pecan picking device in accordance with embodiments of the disclosure. Illustrated in this figure is an individual 500 using the device.

In one embodiment the device has a hose portion 20 and a container body portion 50. The container body portion 50 has a motor portion 40 for providing suction for the device. The pecans 600 on the floor are picked up by the device using air suction provided by the motor portion 40.

In another embodiment, the hose portion 20 also has an extension portion 10. The hose portion 20 is a flexible portion, which is capable of elongating and collapsing. In embodiments the hose portion 20 is made of a rigid material such as but not limited to a polymer or a rubber. The hose portion 20 allows the user 500 of the device to control and direct the air suction provided by the device. The extension portion 10 allows the user 500 of the device to easily grasp this portion and provide better control of the hose portion 20. The extension portion 10 in embodiments is made of a rigid material such as but not limited to, a polymer, rubber, or metal. The extension portion 10 is not flexible, collapsible, or extendable. In embodiments, the hose portion 20 has a length of twelve feet with an outside diameter of two and fourth inches and an inside diameter of two and an eighth inches. In embodiments, the extension portion 10 has a length of four feet with an outside diameter of two and fourth inches and an inside diameter of two and an eighth inches.

The container body portion 50 in embodiments, has the motor portion 40 mounted on the top of the container body portion 50. The top of the container body portion 50 is removable and is attached by a retainer ring 60. The bottom 70 of the container body portion 50 is the portion of the device that allows it to sit on the ground or other surface. In embodiments, the container body portion 50 is a 55 gallon drum made out of a rigid material such as but not limited to polymers, woods, rubbers, metals, and combinations thereof.

In embodiments, the motor portion is a motor with similar characteristics and performance as a Shop Vac® rigid 6.5 horse power Model #WE18510 120V 12 amp 16 gallon motor.

Figure 2:
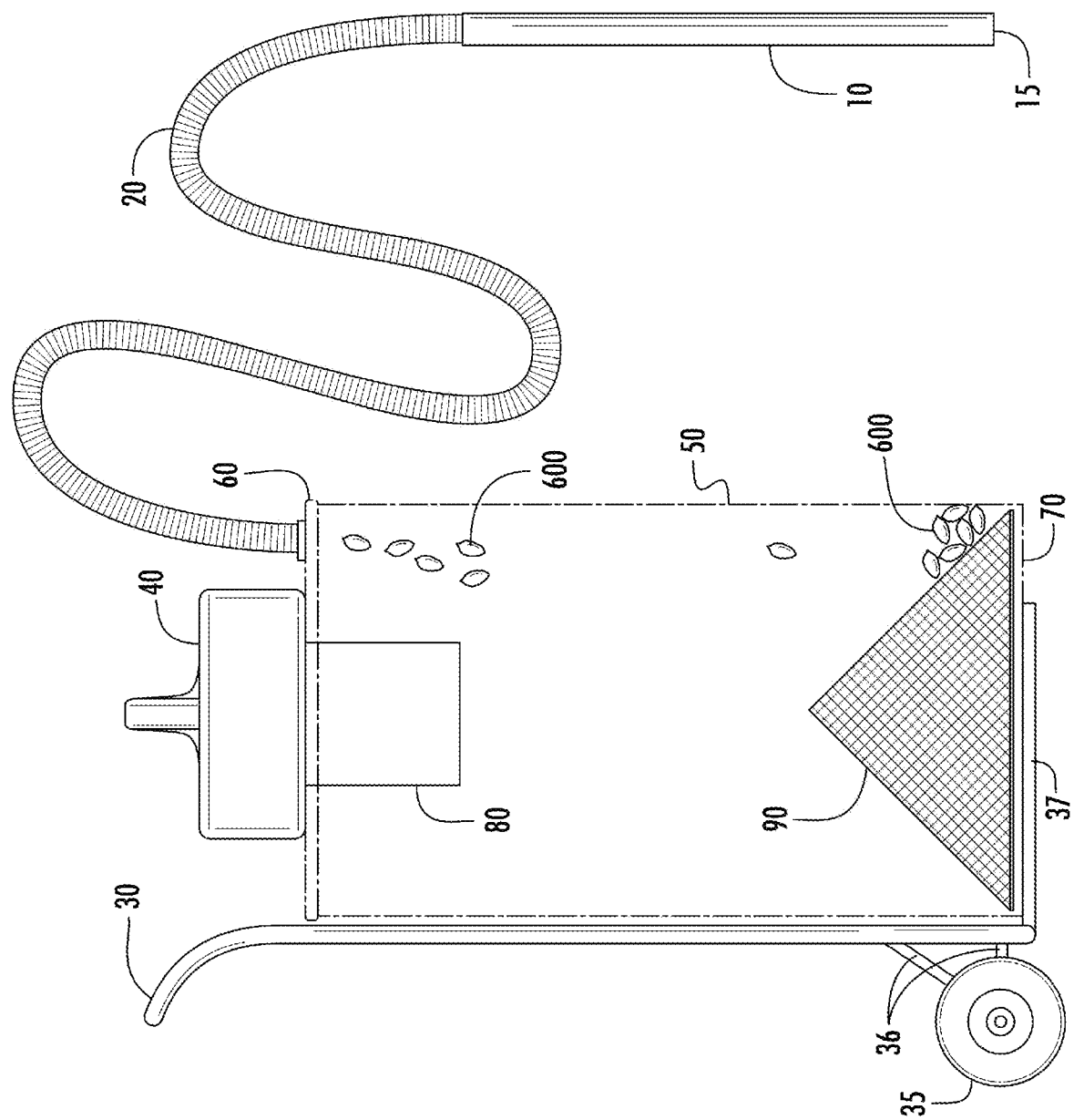
FIG. 2 is a left side cross sectional view of the pecan picking device in accordance with embodiments of the disclosure.

Reference is next made to FIG. 2, a left side cross sectional view of the pecan picking device in accordance with embodiments of the disclosure. In other embodiments the device also has a partition portion 90 for separating the picked up pecans 600 from extra extracted material obtained through the extraction or suction process. As the picked up pecans 600 are sucked into the container body portion 50, other material such as sand, dirt, leaves, and sediment may be brought in as well. The partition portion 90 separates the picked up pecans 600 by providing in an embodiment a mesh material layer supporting the picked up pecans 600 above the partition portion 90 and allowing the separation of the other material to fall through below the partition portion 90.

Also shown in this figure is the inlet 15 of the extension portion 10. As part of the motor portion 40, in embodiments, the motor portion 40 is also comprised of an air filter 80 residing in the container body portion 50.

In embodiments, the device is further comprised of a frame portion 30 for assisting an individual 500 in moving the device. The frame portion 30 is comprised in an embodiment of a handle portion 30 and wheels 35. In another embodiment, the frame portion 30 is also comprised of wheel extensions 36 and a lifting base 37. The wheel extensions 36 attach the wheels 35 to the handle portion 30 of the frame portion 30. The lifting base 37 allows the frame portion to support the underside of the container body portion 50 when the container body portion 50 is lifted or wheeled when being transported.

Figure 3:
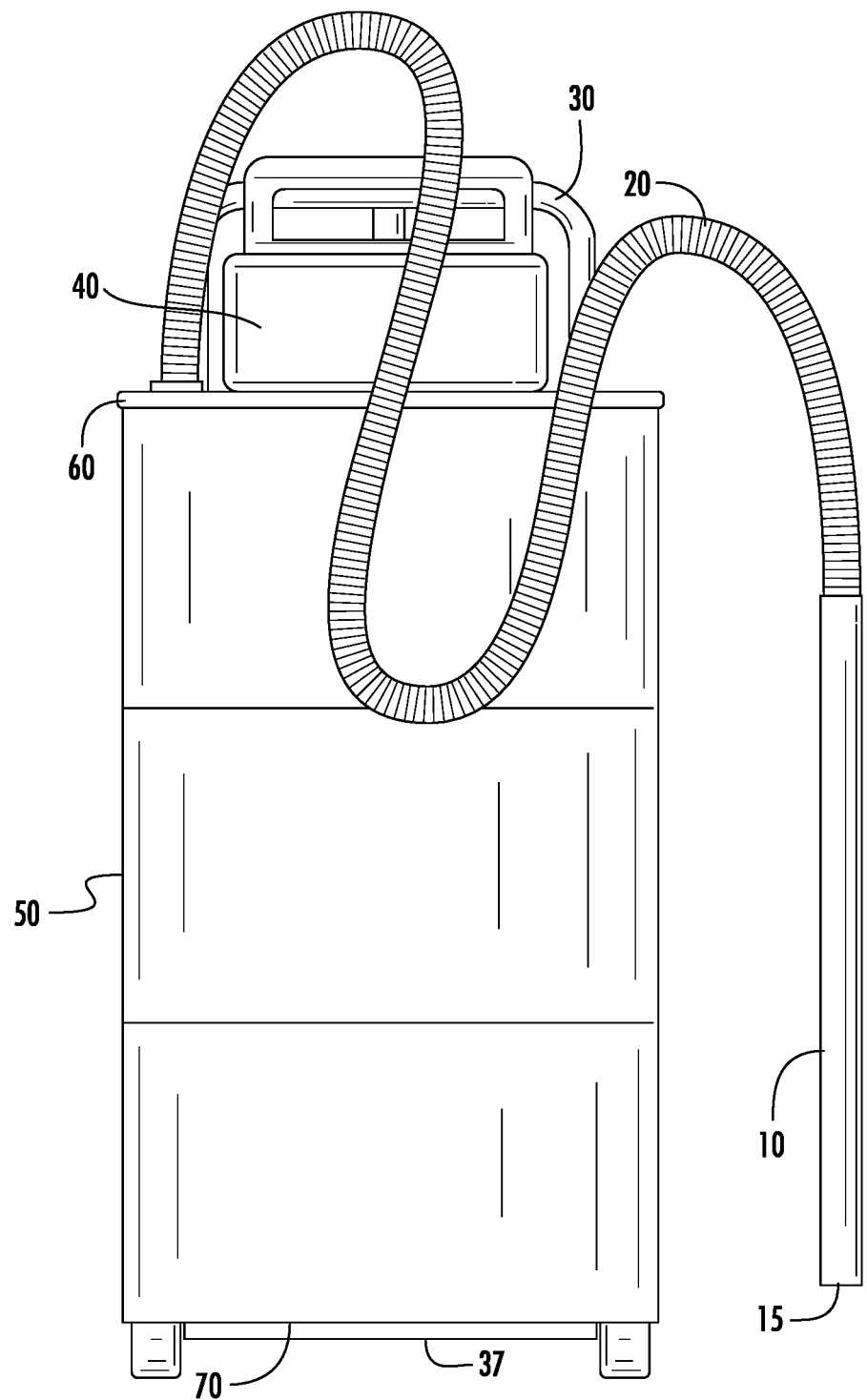
FIG. 3 is a front side view of the pecan picking device in accordance with embodiments of the disclosure.

Reference is now made to FIG. 3, a front side view of the pecan picking device in accordance with embodiments of the disclosure. Illustrated in this figure is the handle portion 30, the motor portion 40, and the lifting base 37 as viewed from the front.

Figure 4:
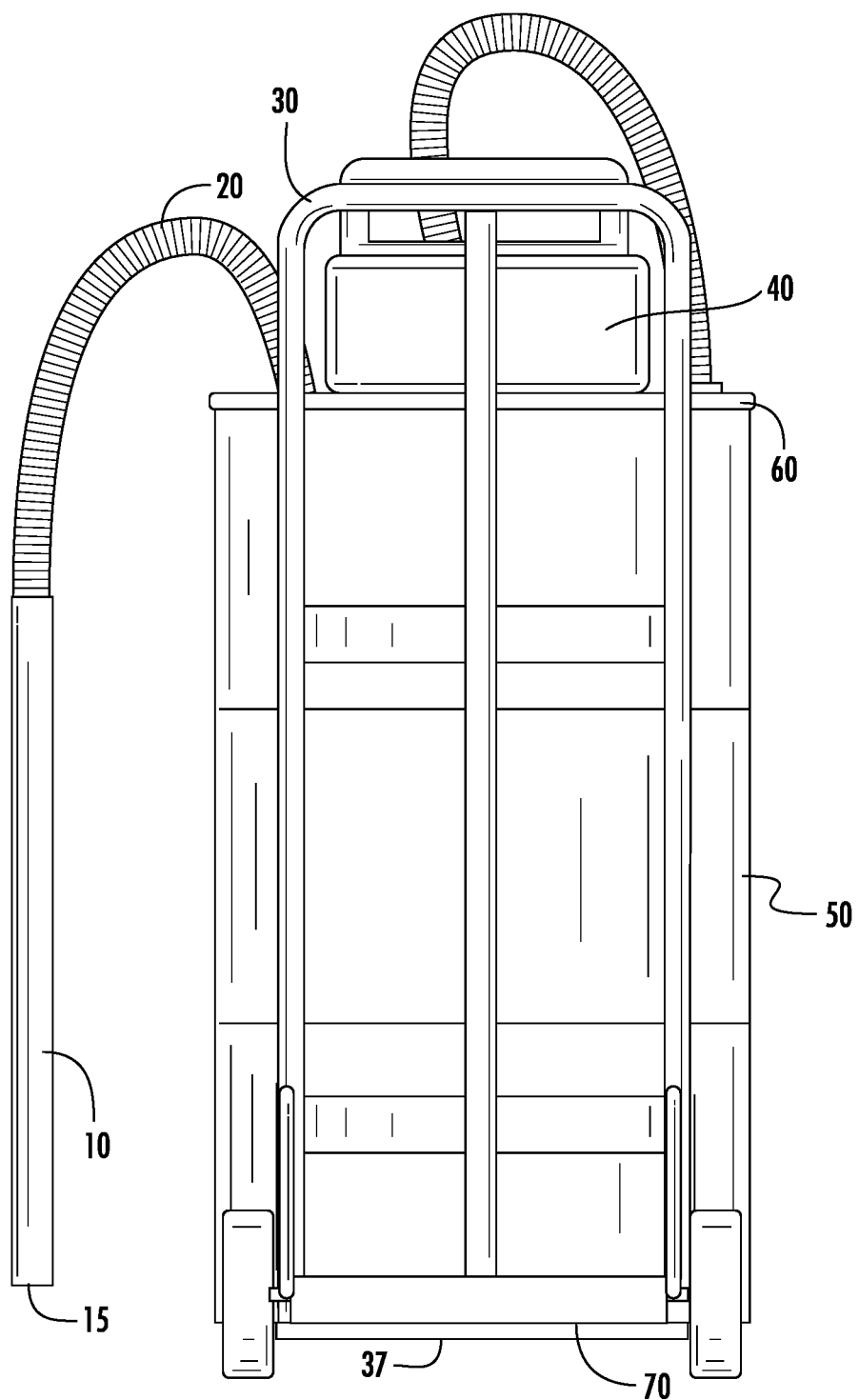
FIG. 4 is a back side view of the pecan picking device in accordance with embodiments of the disclosure.

Reference is next made to FIG. 4, a back side view of the pecan picking device in accordance with embodiments of the disclosure. Illustrated in this figure and more easily seen is the frame portion 30. The handle portion 30 of the frame portion 30 allows the individual or user of the device to easily grab the device for moving. Using the handle portion 30, the individual or user of the device is able to rotate the device on the wheels for easy moving of the device. The lifting base 37 can also be seen in this illustration.

Figure 5:
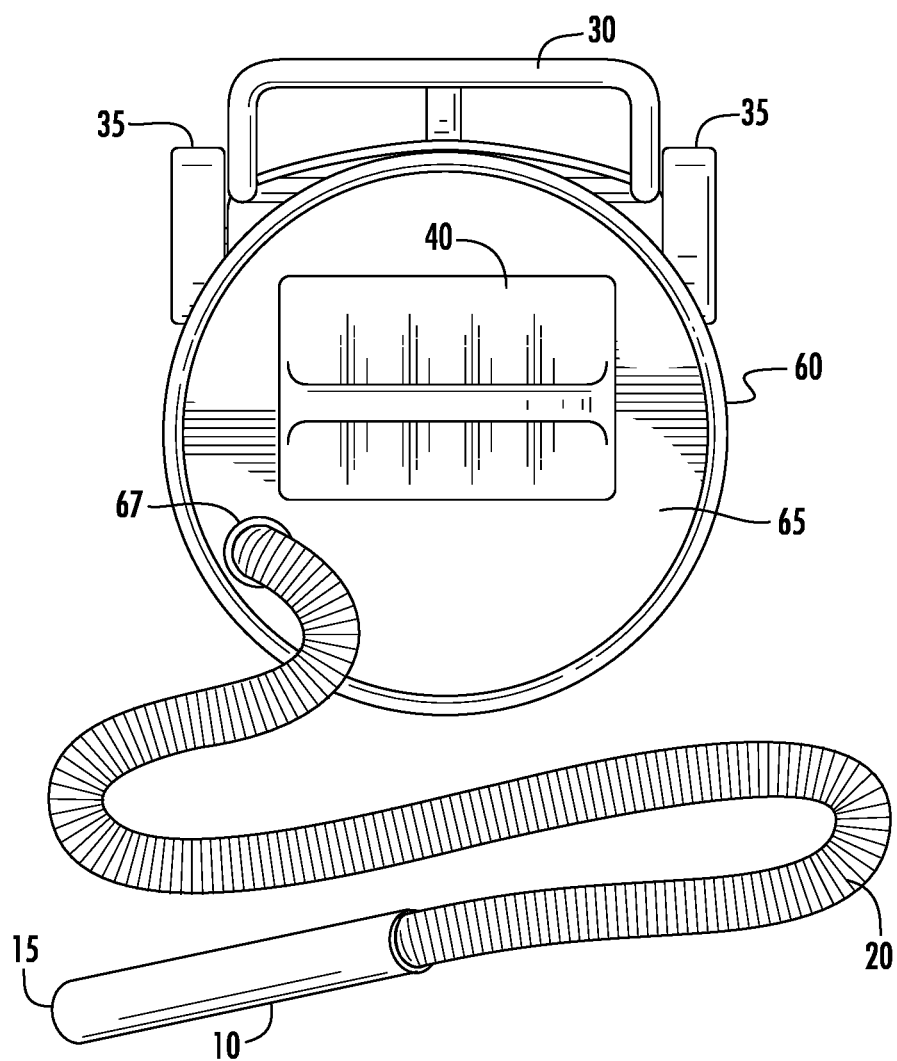
FIG. 5 is a top side view of the pecan picking device in accordance with embodiments of the disclosure.

Reference is now made to FIG. 5, a top side view of the pecan picking device in accordance with embodiments of the disclosure. Illustrated in this figure is the motor portion 40, the top of the container body portion 65, the retainer ring 60, the connector 67 for the hose portion 20. Also illustrated in this figure are the wheels 35 and the handle portion 30. In an embodiments the device has two wheels 35. In an embodiment, the device may have no wheels 35. In yet other embodiments, the device may have only one wheel 35.

Figure 6:
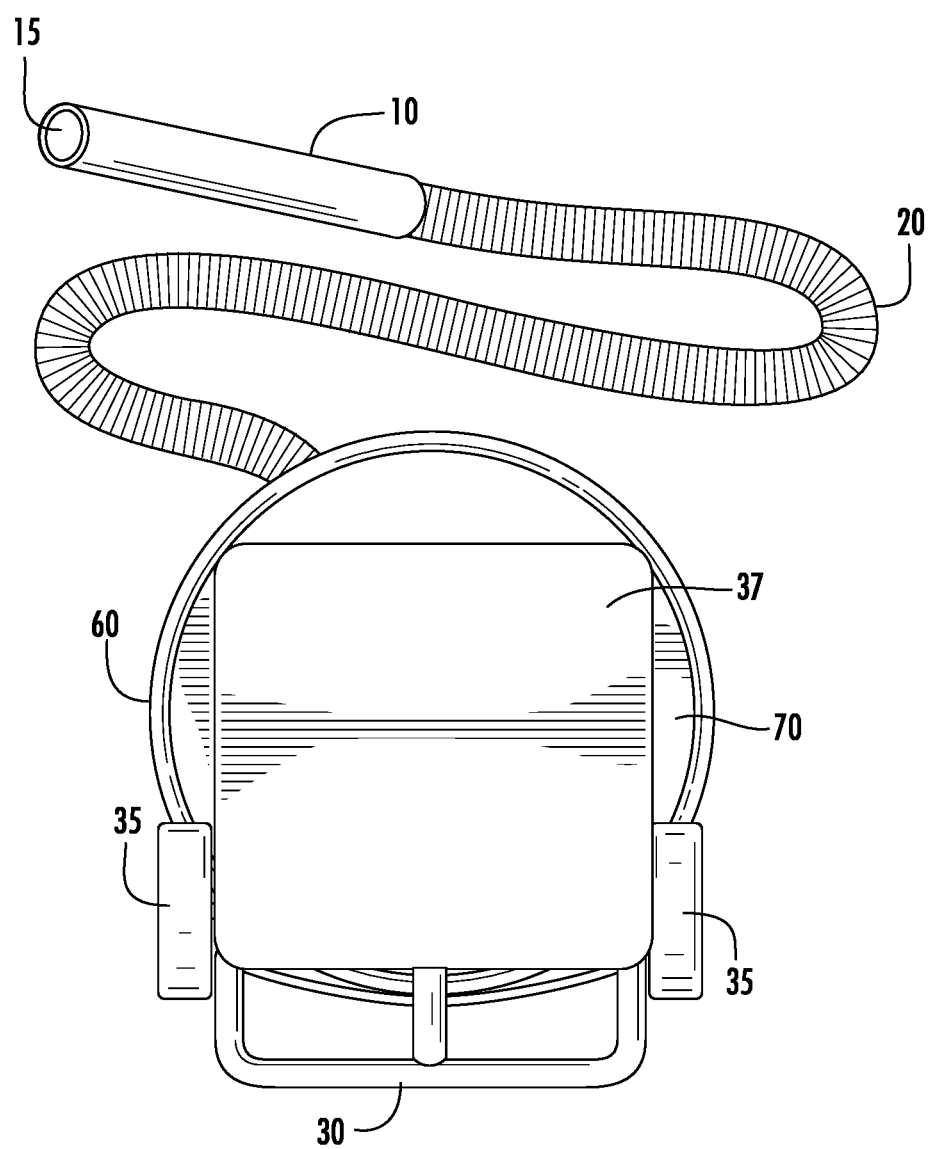
FIG. 6 is a bottom side view of the pecan picking device in accordance with embodiments of the disclosure.

Reference is lastly made to FIG. 6, a bottom side view of the pecan picking device in accordance with embodiments of the disclosure. Illustrated in this figure and better seen is the lifting base or lifting base portion 37 of the device. In embodiments, the lifting base portion 37 provides support underneath the container body portion 50 at the bottom portion 70 for lifting the device. In embodiments, the frame portion 30 is connected to the lifting base portion 37 and the lifting base portion 37 is connected to the container body portion 50. In other embodiments, the frame portion 30 is connected directly to the container body portion 50 and there is no lifting base portion 37.

In brief, the invention is directed to a device and method of use for a pecan picker.

The disclosed device and method of use is generally described, with examples incorporated as particular embodiments of the invention and to demonstrate the practice and advantages thereof. It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention. Terms such as "a", "an", and "the" are not intended to refer to only a singular entity, but include the general class of which a specific example may be used for illustration. The terminology herein is used to describe specific embodiments of the invention, but their usage does not delimit the disclosed device or method of use, except as may be outlined in the claims.

Alternative applications for this invention include using this device or method of use in any application where a particular material is desired to be picked with separation occurring of the picked material from extra material obtained through the suction process. Consequently, any embodiments comprising a one piece or multi piece device having the structures as herein disclosed with similar function shall fall into the coverage of claims of the present invention and shall lack the novelty and inventive step criteria.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific device and method of use described herein. Such equivalents are considered to be within the scope of this invention and are covered by the claims.

All publications, references, patents, and patent applications mentioned in the specification are indicative of the level of those skilled in the art to which this invention pertains. All publications, references, patents, and patent application are herein incorporated by reference to the same extent as if each individual publication, reference, patent, or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

The device and/or methods of use disclosed and claimed herein can be made and executed without undue experimentation in light of the present disclosure. While the device and methods of use of this invention have been described in terms of preferred embodiments, it will be apparent to those skilled in the art that variations may be applied to the device and/or methods of use and in the steps or in the sequence of steps of the method of use described herein without departing from the concept, spirit, and scope of the invention.

More specifically, it will be apparent that certain components, which are both shape and material related, may be substituted for the components described herein while the same or similar results would be achieved. All such similar substitutes and modifications apparent to those skilled in the art are deemed to be within the spirit, scope, and concept of the invention as defined by the appended claims.

What is claimed is:

1. A device for picking up pecans comprising:
a hose portion and a container body portion; where the container body portion has a motor portion connected to the hose portion providing air suction which is used to pick up pecans; where the container body portion has a top and the motor portion is mounted on the top of the container body portion; a bottom having a conical shaped partition portion forming an edge of the bottom; where the partition portion separates the picked up pecans from extra extracted material obtained through the extraction process; where the partition portion separates the pecans using a mesh material layer which supports the pecans above the conical shaped partition portion and allows the separation of the extra extracted material to fall through and below the conical shaped partition portion.

2. A device according to claim 1 comprising:
Where the top of the container body portion is removable and is attached by a retainer ring.

3. A device according to claim 1 comprising:
where the container body portion is a 55 gallon drum.

4. A device according to claim 1 comprising:
Where the hose portion can elongate and collapse.

5. A device according to claim 1 comprising:
Having an extension portion attached to the hose portion.

6. A device according to claim 1 comprising:
Where the hose portion has a length of twelve feet with an outside diameter of two and a fourth inches and an inside diameter of two and an eighth inches.

7. A device according to claim 1 comprising:
a frame portion having a handle portion and wheels.

8. A device according to claim 1 comprising:
a frame portion having a lifting base.

9. A device according to claim 8 comprising:
where the frame portion is also comprised of wheel extensions and the lifting base.

10. A device according to claim 9 comprising:
Having the wheel extensions attaching the wheels to the handle portion of the frame portion.

11. A device according to claim 9 comprising:
Where the lifting base allows the frame portion to support the container body portion when the container body portion is lifted or wheeled.

12. A method for a pecan picking using the device as claimed in claim 1.

* * * * *